United States Patent
Shimizu et al.

(10) Patent No.: US 6,684,198 B1
(45) Date of Patent: *Jan. 27, 2004

(54) PROGRAM DATA DISTRIBUTION VIA OPEN NETWORK

(75) Inventors: Yusuke Shimizu, Tokyo (JP); Yoichi Uchida, Tokyo (JP); Seiji Adachi, Tokyo (JP); Eric Rayburn Hammond, Menlo Park, CA (US); Yasuhiro Noguchi, Emeryville, CA (US); Paul Mitchell Heilman, III, San Mateo, CA (US); Daniel Luke Poling, Jr., Redwood City, CA (US)

(73) Assignee: Sega Enterprises, Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 53 days.

(21) Appl. No.: 08/922,339

(22) Filed: Sep. 3, 1997

(51) Int. Cl.[7] .............................................. G06F 17/60
(52) U.S. Cl. .............................. 705/50; 705/51; 705/1; 705/58; 705/59
(58) Field of Search ............................... 705/35, 44, 1, 705/50, 51, 53, 54, 57, 59, 52, 64, 26; 380/4, 25, 21, 23; 713/155, 200

(56) References Cited

U.S. PATENT DOCUMENTS

| | | | | |
|---|---|---|---|---|
| 4,771,458 A | * | 9/1988 | Citta et al. | 380/20 |
| 5,138,712 A | * | 8/1992 | Corbin | 713/200 |
| 5,191,611 A | * | 3/1993 | Lang | 380/25 |
| 5,237,611 A | * | 8/1993 | Rasmussen et al. | 380/21 |
| 5,237,614 A | * | 8/1993 | Weiss | 380/23 |
| 5,495,533 A | * | 2/1996 | Lineham et al. | 713/155 |
| 5,666,411 A | * | 9/1997 | McCarty | 380/4 |
| 5,715,403 A | * | 2/1998 | Stefik | 705/44 |
| 5,765,152 A | * | 6/1998 | Erickson | 707/9 |
| 5,870,474 A | * | 2/1999 | Wasilewski et al. | 380/21 |
| 5,892,900 A | * | 4/1999 | Ginter et al. | 395/186 |
| 5,909,638 A | * | 6/1999 | Allen | 455/6.1 |
| 6,000,030 A | * | 12/1999 | Steinberg et al. | 713/200 |
| 6,135,646 A | * | 10/2000 | Kahn et al. | 395/200.47 |

FOREIGN PATENT DOCUMENTS

| | | | | |
|---|---|---|---|---|
| JP | 05081204 A | * | 4/1993 | G06F/15/00 |

OTHER PUBLICATIONS

Denning, Dorothy E.; Branstad, Dennis K., "A taxonomy for key escrow encryption systems", Communications of the ACM v39n3 PP:34–39 Mar. 1996.*

* cited by examiner

Primary Examiner—James P. Trammell
Assistant Examiner—Calvin Hewitt
(74) Attorney, Agent, or Firm—Dickstein Shapiro Morin & Oshinsky LLP

(57) ABSTRACT

When program data is distributed to users across an open network, such as the Internet, a licensing agreement concluded between a server for the program data and a manager is maintained and the unauthorized copying of program data is prevented. Therefore, to fulfill such the situation, a program data distribution system includes an open network; a file server, connected to the open network, for distributing encrypted program data; a key server, connected to the open network, for distributing a decryption key used to decode the encrypted program data; and a terminal, connected to the open network, for processing program data, the terminal employing the decryption key distributed by the key server to decode the encrypted program data obtained from the file server.

22 Claims, 4 Drawing Sheets

PROGRAM DATA DISTRIBUTION VIA OPEN NETWORK

BACKGROUND OF THE INVENTION

1. Field of the Invention

The present invention relates to a system for the distribution of program data to users connected to an open network, such as the Internet. In particular, the present invention relates to a method for enabling the management of security and of license in a system for distributing program data, which can be executed by a video game machine, to users via an open network.

2. Related Arts

At present, it is possible for an arbitrary user to build a server and to offer program data to the public on the Internet. For program data that are available from a sever on the Internet, a licensing contract with a copyright holder is often required in order for the data to be used.

A very effective business gambit for the owner of program data is the wide distribution, for a price, of the program to users via an open network, such as the Internet. Furthermore, when the sale of the program is performed by third persons, the business opportunities available to the program data owner are increased.

Currently, for the sale of ROM cassettes or CD-ROM disks holding game programs for use with a video game machine, a licensing agreement is usually concluded with the maker of the video game machine.

When the licensing agreement is concluded, security code is added to game programs stored in ROM cassettes or on CD-ROM disks to authenticate the game programs.

In this case, the video game machine will include a checking function for determining whether or not a game program stored in a ROM cassette or on a CD-ROM disk has been authenticated, and will also include a protection mechanism that prevents the execution of a game program produced by a maker who has no license.

When program data is to be distributed via an open network such as the Internet, however, no such protection mechanism for checking security is available. Therefore, distribution of program data by an unlicensed maker can not be prevented.

In such a case, a licensing agreement process for the sale of game programs will not have been established. Also, a charge system for program data that is used across an open network, such as the Internet, has to be considered.

For these reasons, there is a demand for a system that facilitates security and licensing management, and the distribution of data to users via an open network.

SUMMARY OF THE INVENTION

It is, therefore, one object of the present invention to provide a system for distributing program data, such as game program data, to users across an open network, such as the Internet.

It is another object of the present invention to provide a system, for distributing program data to users across an open network, that permits the licensing of a third person business to perform data distribution.

It is an additional object of the present invention to provide a system, for distributing program data across an open network, that can easily introduce a charge system.

It is a further object of the present invention to provide a system, for distributing program data to users across an open network, that can prevent the unauthorized copying of program data.

To achieve the above objects, the basic concept of the present invention comprises:

an open network;

a file server, connected to the open network, for distributing encrypted program data;

a key server, connected to the open network, for distributing a decryption key used to decode the encrypted program data; and a terminal, connected to the open network, for processing program data, the terminal employing the decryption key distributed by the key server to decode the encrypted program data obtained from the file server.

The other objects of the present invention will become apparent during the course of the detailed description of the embodiment of the present invention, which will be given while referring to the accompanying drawings.

DETAILED DESCRIPTION OF THE PREFERRED EMBODIMENT

Figure 1:
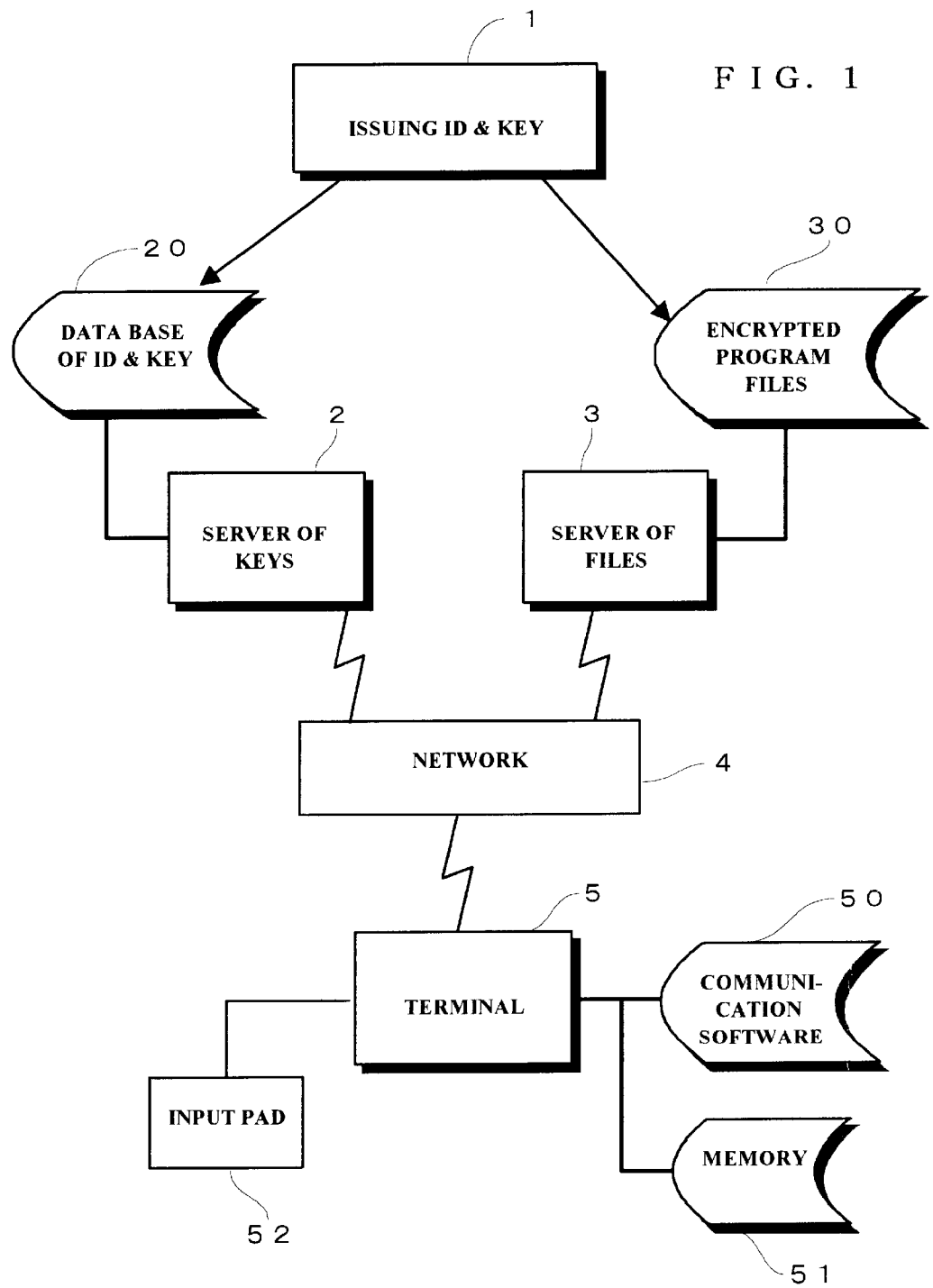
FIG. 1 is a diagram illustrating the basic structure of a program data distribution system for use on an open network according to the present invention.

The preferred embodiment of the present invention will now be described while referring to the accompanying drawings. The same reference numerals or symbols are used throughout to denote corresponding or identical components.

FIG. 1 is a diagram illustrating the basic structure of a program data distribution system for use on an open network according to the present invention. A file server 3, which distributes encrypted program data (hereinafter simply referred to as a program); a key server 2, which distributes a decryption key which decodes the distributed encrypted program for removing encryption; and a terminal 5, which is provided for a user, are connected to an open network 4, such as the Internet.

A manager 1 provides an inherent identification (ID) code or number for each program, and issues and manages an encryption key and a decryption key. A manager for the file server 3 includes a licensing agreement with the manager 1, and is granted the right to distribute program data with an ID number appended thereto. A program having an ID number is encrypted using an encryption key that is issued by the manager 1. In addition, the file server 3 has a memory 30 in which the encrypted program is stored.

The key server 2 has a memory 20 in which an ID number provided by the manager 1 and a corresponding decryption key for decoding an encrypted program are stored in a database.

A manager for the key server 2 is identical to the manger 1 or is a person who is authorized by the manager 1.

The terminal 5 has communication software 50 following a protocol for communication across the network 4 with the file server 3 and the key server 2, and a memory 51, for example, a large external storage device, whereto programs transmitted by the file server 3 are downloaded and wherein they are stored. In addition, an input pad 52 with which a user enters command data for the terminal 5 is provided as needed.

Figure 2:
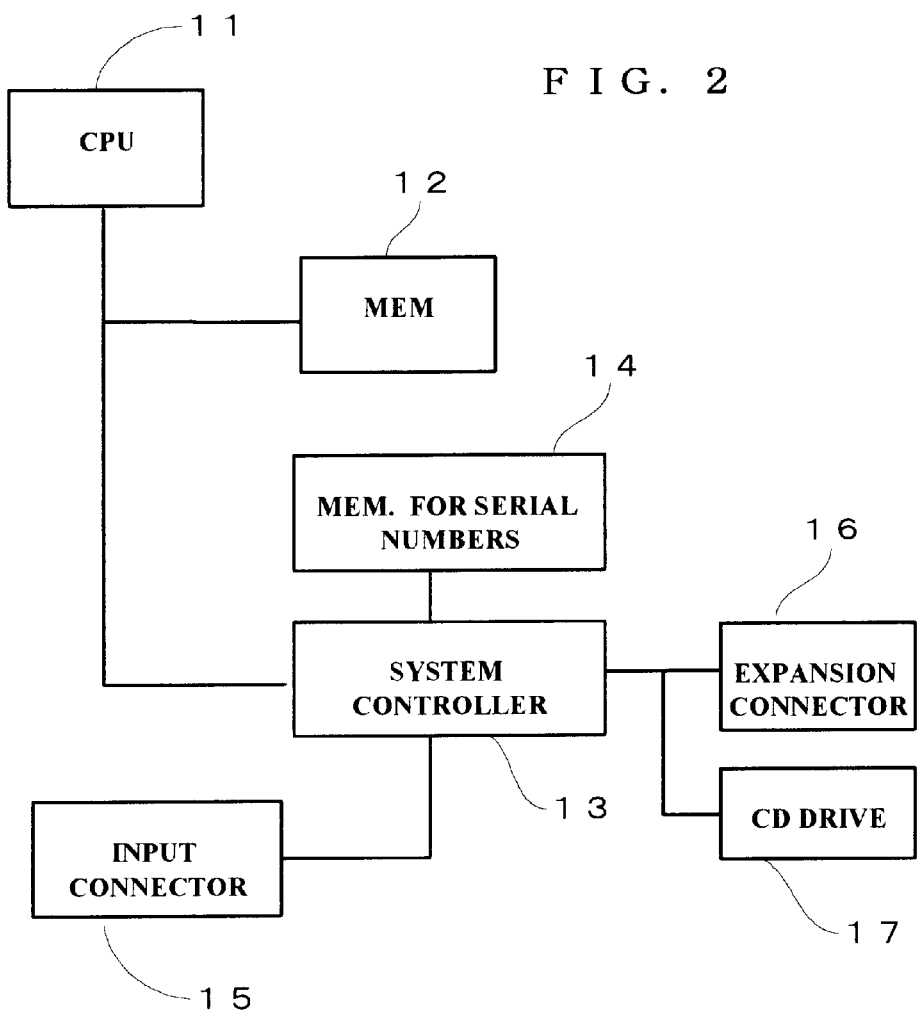
FIG. 2 is a block diagram illustrating the structure of a terminal that is employed in the system in FIG. 1.

FIG. 2 is a block diagram illustrating the structure of the terminal 5, such as a video game machine. A CPU 11 serves as control means for executing a program. A memory 12 is constituted by a ROM and a RAM, in which a program and data required for the execution of the program by the CPU 11 are temporarily stored, and in which a BIOS program is stored.

A code or number inherent to a terminal, which is provided during the manufacture of the terminal, is written to a serial number memory 14. A system controller 13 serves as an interface for the exchange of data by the CPU 11 and other sections.

The input pad 52 is connected to an input/output connector 15. The memory 51, which is an external memory device, or a display device, such as a CRT (not shown), are connected to an expansion connector 16. A CD drive 17 is provided to read game software and communication software.

Figure 3:
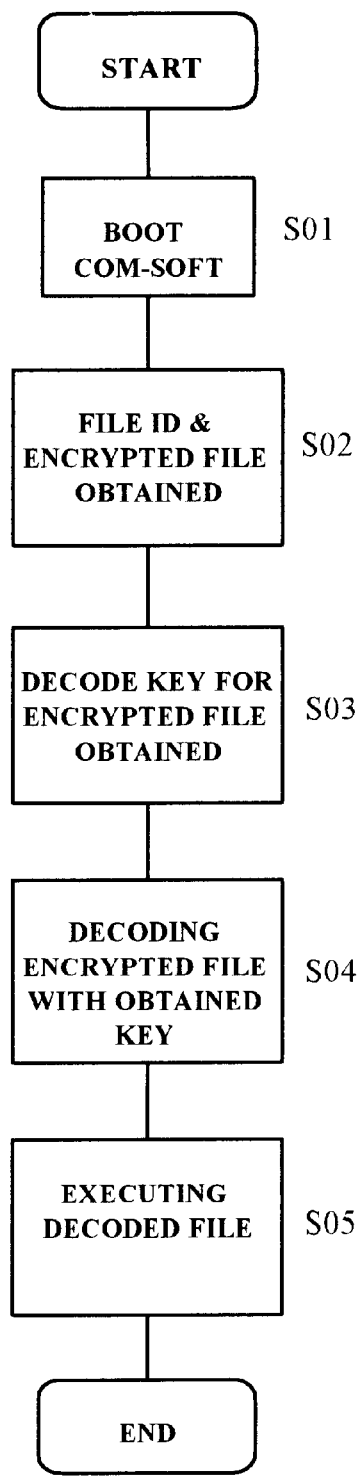
FIG. 3 is a flowchart showing the basic processing performed by the system in FIG. 1.

The detailed processing for the thus structured terminal 5 will be described later while referring to the writing and reading of a program in the memory 51. FIG. 3 is a flowchart showing the basic processing performed by the program data distribution system across an open network according to the present invention.

First, when a user powers on the terminal 5 in FIG. 1, the communication software 50 is activated (step S01). A communication protocol between the terminal 5, and the file server 4 and the key server 2 is established to prepare for communication activities.

The user manipulates the input pad 52 and enters a command in the terminal 5 to acquire a program file and an ID number that corresponds to the program file from the file server 3. The terminal 5 receives the ID number and an encrypted program from the file server (step S02).

The terminal 5 transmits the received ID number to the key server 2 under the control of the communication software. The key server 2 employs the ID number received from the terminal 5 to search the database 20 for a corresponding decryption key, and transmits the key to the terminal 5 (step S03).

The terminal 5 decodes the encrypted program received from the file server 3 by employing the decryption key received from the key server 2 (step S04).

As a result, the program transmitted by the file server 3 can be executed by the terminal 5 (step S05).

The relationship between the encrypted program and the decryption key will now be described.

The method used for encrypting a program are not limited for the present invention. Any of various encryption methods that have been proposed can be employed for the present invention.

The RSA (Rivest, Shamir, Adleman) public key encryption method is proposed. This RSA data encryption method employs a pair of keys: a public key and a secret key. The public key is used to encrypt a program, and the secret key is used to decode it.

Although the following explanation for the embodiment will be given on the assumption that this key relationship exists, the present invention is not limited to this relationship. In other words, the secret key can be used to encrypt a program and the public key can be used to decode it.

It is especially easy with the RSA encryption method to extract the public key from the secret key. When a user acquires the secret key from the key server 2 to decode the RSA encrypted data, the public key can be extracted from the secret key, so that a user who also obtains the public key could perform an unauthorized decryption.

When a program is encrypted by using the secret key, and the public key is used to decode the encrypted program, a user can obtain only the public key, and the probability that this will result in an unauthorized decryption is reduced.

If the RSA encryption method is employed for the present invention in accordance with the provisions of the above described relationship between the public key and the secret key, the public key is transmitted from the manager 1 to a manager for the file server 3, and a corresponding secret key is transmitted from the manager 1 to a manager for the key server 2.

For decryption, the public key used for encryption and the secret key must correspond to each other. In this embodiment, therefore, the identification (ID) number of a program is employed to determine whether the public key and the secret key correspond.

The ID number for each program specifies a secret key that corresponds to a public key that is used for program encryption. When the ID number is transmitted by the terminal 5 to the key server 2, by using the ID number the key server 2 can search the database 20 for the secret key that corresponds to the public key that was used for encryption.

Figure 4:
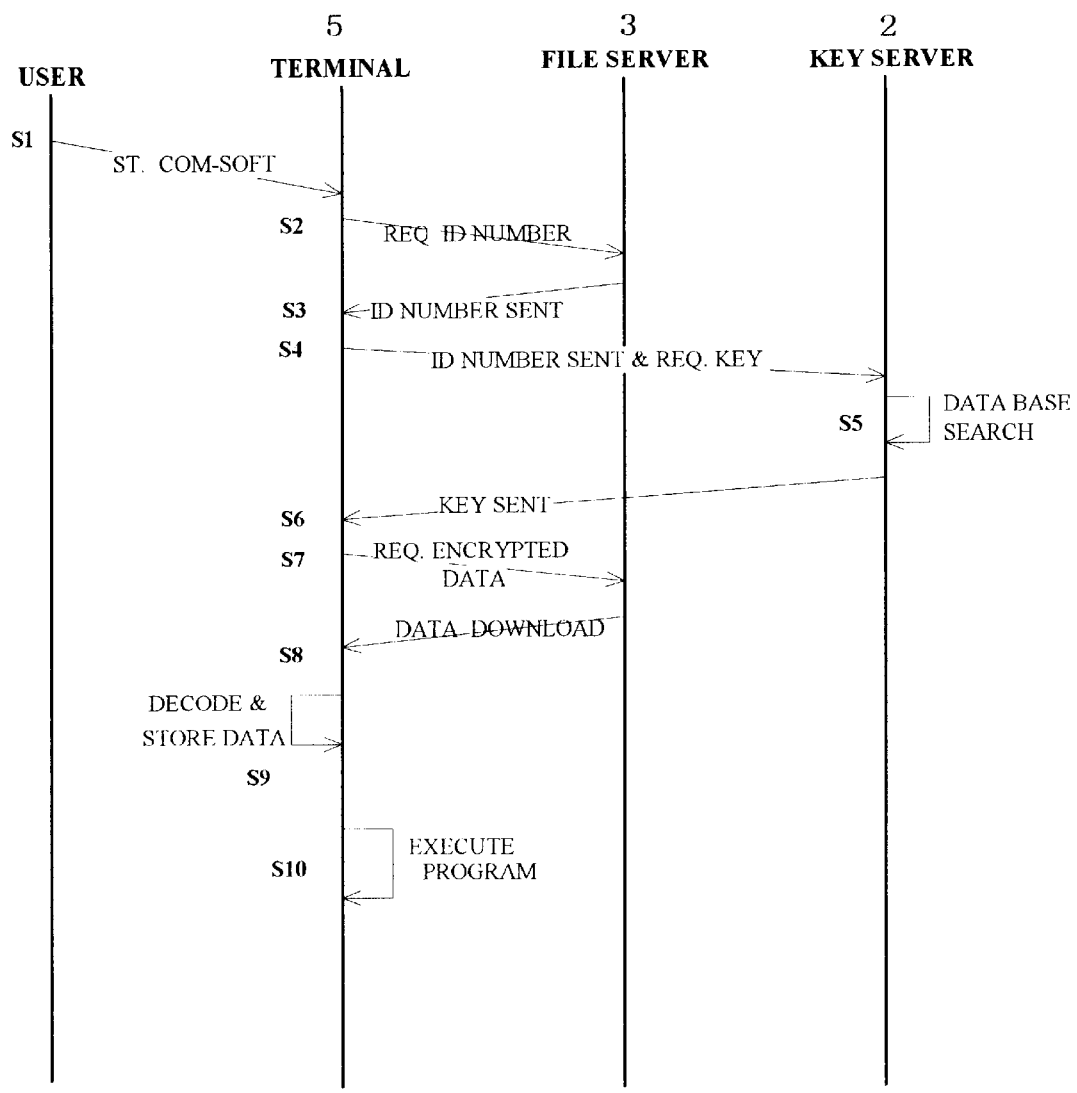
FIG. 4 is a diagram illustrating an example sequence of operations according to the basic processing in FIG. 3.

FIG. 4 is a diagram showing the sequence of operations performed by devices to explain the operation, based on the basic processing in FIG. 3, of the program data distribution system of the present invention.

In FIG. 4, a user activates the communication software 50 by powering on the terminal 5 (step S1). Via the network 4, the terminal 5 requests that the file server 3 transmit an ID number (step S2).

At this time, a method is preferably adopted whereby authorization for a user so that he or she can receive the program distribution service is registered in advance at the file server 3.

In this case, a user registration number is also transmitted when a request for the transmission of an ID number is issued to the file server 3 by the terminal 5 (step S2). The file server 3 employs the received registration number to ascertains whether the user is authorized to receive the ID number, and transmits the requested ID number to the requesting terminal 5 (step S3).

Under the control of the communication software 50, the terminal 5 transmits the received ID number to the key server 2 and requests the transmission of a decryption key (step S4).

The key server 2 searches the database 20, using the received ID number as an address, and reads out a corresponding decryption key (step S5). The key server 2 then transmits the obtained decryption key to the terminal 5 (step S6).

Upon receipt of the decryption key, the terminal 5 can request that the file server 3 transmit the encrypted program (step S7). The encrypted program that is requested is transmitted to the terminal 5 and is downloaded by it (step S8).

Therefore, the terminal 5 decodes or decrypts the downloaded encrypted program by using the decryption key, and stores the decrypted program in the memory 51 (step S9). As a result, the terminal 5 can read the program from the memory 51 and execute it as needed (step S10).

The sequence of operations from steps S2 to S8 is not limited to that shown in the example in FIG. 4. The order of the sequence can be changed without causing a contradiction. For example, although in this case a request for the transmission of an ID number and a request for the transmission of program data are issued to the file server 3 at different steps, these requests can be issued at the same step.

Charging for the distribution of a program will now be explained. In the above embodiment, when a user is registered in advance in the file server 3, a table for each registered subscriber is provided for the file server 3. Then, each time a program that was requested by a user is transmitted the action taken is recorded in a corresponding table, so that the user can be charged later for the service that was performed.

Similarly, a subscriber table is provided for the key server 2, and each time a request for the transmission of a decryption key is received from a user, the action taken is recorded, so that a charge for the service can be levied against the user.

A program that is downloaded by an authorized user and is stored in the memory 51 could later be read from the memory 51 and used by an unauthorized person.

The structure of the terminal 5 shown in FIG. 2 is so designed that it can prevent the occurrence of such a problem.

Referring back to FIG. 2, when a program is downloaded to the memory 51, which is an external memory device connected to the expansion connector 16 for storing a decoded program, the CPU 11, via a system controller 13, reads a serial code or number inherent to a terminal from the serial number memory 14. Following this, the CPU 11 encrypts the downloaded program by using the serial number, and writes it to the memory 51.

To read the program stored in the memory 51 and execute it, the CPU 11, via the system controller 13, again reads the serial number inherent to the terminal from the serial number memory 14. The CPU 11 decodes the program read from the memory by using the serial number. The decoding can be effected by performing an inverse logical operation using the serial number that was employed for encryption.

Therefore, even when the contents in the memory 51, which is an external memory device, are read while it is disconnected from the terminal 51 and are analyzed, so long as the serial number used for encryption remains a secret, or so long as the memory 51 is not connected to the terminal 5, it is difficult to decrypt an encrypted program stored in the memory 51.

As is described above, according to the present invention, since security is ensured for the distribution of a program across an open network, such as the Internet, a licensing business can be established.

In addition, it is easy to prevent a distributed program that has been downloaded from being used by an unauthorized person.

The above embodiment, with the drawings, has been employed as an example to describe the present invention, but the present invention is not limited to that which has been disclosed. The scope of the present invention is as defined in the claims, and what is equivalent to the descriptions of the claims should also become within the scope of the present invention.

What is claimed is:

1. A terminal comprising:
   control means for processing encrypted program data transmitted by a file server connected to an open network;
   a first memory for storing program data that is distributed by said file server and that is decoded by using a decryption key, which is transmitted from a key server connected to the open network; and
   a second memory for storing a serial code;
   before said program data that is decoded is stored in said first memory, said control means encrypting said program data by using the serial code stored in the second memory, and before said program data is read from said first memory, said control means decoding said program data by using said serial code.

2. A program data distribution method for use with an open network comprising the steps of:
   issuing an identification code corresponding to program data, an encryption key which is used to encrypt said program data and a decryption key which is used to decode the program data encrypted by the encryption key;
   distributing program data encrypted by the encryption key from a file server connected to said open network;
   distributing a decryption key from a key server connected to said open network, said decryption key used to decode said encrypted program data; and
   employing said decryption key distributed by said key server to decode said encrypted program data obtained from said file server by a terminal, which is connected to said open network for processing program data,
   wherein, at the step of distributing encrypted program data, the identification code is transmitted along with the program data to the terminal, the terminal transmits the received identification code to the key server, and based on the identification code, the key server searches for a decryption key used to decrypt the program data and transmits the decryption key to the terminal.

3. The program data distribution method for use with an open network according to claim 2, wherein, at the step of distributing said encrypted program data, said file server has a table for each subscriber, and when said program data is transmitted to a subscriber, said transmission is recorded in said table for employment as charge data for a service afforded subscriber.

4. The program data distribution method for use with an open network according to claim 2, wherein at the step of distributing said decryption key, which is used to decode said encrypted program data, said key server has a table for each subscriber, and when said program data is transmitted to a subscriber, said transmission is recorded in said table for employment of charge data for a service afforded subscriber.

5. The program data distribution method for use with an open network according to claim 2, wherein said open network is the Internet.

6. The program data distribution method for use with an open network according to claim 2, wherein said encryption key is a public key and said decryption key is a secret key, and wherein, using the RSA encryption method, said program data is encrypted by employing said public key.

7. The program data distribution method for use with an open network according to claim 2, wherein said encryption key is a secret key and said decryption key is a public key, and wherein, using the RSA encryption method, said program data is encrypted by employing said secret key.

8. A program data distribution method, for use with an open network, comprising the steps of;
   issuing an identification code corresponding to program data, an encryption key which is used to encrypt said program data and a decryption key which is used to decode the program data encrypted by the encryption key;
   distributing program data encrypted by the encryption key from a file server connected to said open network;

downloading said encrypted program data, which is distributed by said file server, at a terminal that is connected to said open network and processes said program data;

distributing a decryption key from a key server connected to said open network, said decryption key used to decode said encrypted program data that is transmitted by said file server; and employing, at said terminal, said decryption key received from said key server to decode said encrypted program data that is downloaded, wherein at the step of distributing encrypted program data the identification code is distributed along with the program data, at the step of downloading the identification code is transmitted to the key server, and at the step of distributing a decryption key the identification code is employed by the key server to search for a decryption key that is used to decode the program data.

9. The program data distribution method for use with an open network according to claim 8, wherein at the step of employing said decryption key, said terminal employs an inherent serial code to encrypt said program data that is decoded, and stores encrypted program data in a memory; and when said program data stored in said memory is to be read, said terminal decrypts said encrypted program data by using said inherent serial code.

10. The program data distribution method for use with an open network according to claim 8, wherein said key server has a table for each subscriber, and when said program data is transmitted to a subscriber, said transmission is recorded in said table for employment of charge data for a service afforded subscriber.

11. The program data distribution method for use with an open network according to claim 8, wherein, at the step of distributing said encrypted program data, said file server has a table for each subscriber, and when said program data is transmitted to a subscriber, said transmission is recorded in said table for employment as charge data for a service afforded subscriber.

12. The program data distribution method for use with an open network according to claim 8, wherein said open network is the Internet.

13. The program data distribution method for use with an open network according to claim 8, wherein said encryption key is a public key and said decryption key is a secret key, and wherein, using the RSA encryption method, said program data is encrypted by employing said public key.

14. The program data distribution method for use with an open network according to claim 8, wherein said encryption key is a secret key and said decryption key is a public key, and wherein, using the RSA encryption method, said program data is encrypted by employing said secret key.

15. A computer-readable storage medium storing a control program for being executed in a terminal connected to an open network, for use in a data distribution method, the control program controlling the terminal to perform a method comprising the steps of:

receiving the encrypted program data distributed from a file server connected to said open network;

receiving an identification code corresponding to the encrypted program data from the file server;

sending the identification code to a key server connected to the open network;

receiving a decryption key used to decode said encrypted program data from the key server; and employing said decryption key distributed by said key server to decode said encrypted program data obtained from said file server, wherein the method performed by the terminal further comprises the steps of employing an inherent serial code to encrypt the decoded program data, storing encrypted program data in a memory, and decrypting the encrypted program data by using inherent serial code when the program data encrypted and stored in the memory is read out.

16. A program data distribution system for use with an open network comprising:

a manager for issuing an identification code corresponding to program data, an encryption key which is used to encrypt said program data and a decryption key which is used to decode the program data encrypted by the encryption key;

a file server, connected to said open network and holding distribution rights for the program data based on a contract with said manager, for encrypting program data by the encryption key issued from the manager and distributing the encrypted program data along with the corresponding identification code;

a key server, connected to said open network, and independent from the file server, for distributing the decryption key issued by said manager; and a terminal, connected to said open network, for receiving the encrypted program data along with the corresponding identification code from the file server, and obtaining the decryption key corresponding to the identification code from the key server to decode and process the encrypted program data.

17. The program data distribution system for use with an open network according to claim 16, wherein said terminal includes control means for processing said decoded program data that is decrypted by using said decryption key, a first memory for storing said decoded program data, and a second memory for storing a serial code inherent to said terminal; and when said decoded program data is to be stored in said first memory, said control means encrypts said decoded program data by using said serial code stored in the second memory; and when said program data stored in said first memory is to be read, said control means decrypts said encrypted program data by using said serial code.

18. The program data distribution system for use with an open network according to claim 16, wherein said file server has a table for each subscriber; and when said program data is transmitted to a subscriber, said transmission is recorded in said table for employment as charge data for a service afforded subscriber.

19. The program data distribution system for use with an open network according to claim 16, wherein said key server has a table for each subscriber, and wherein when said program data is transmitted to a subscriber, said transmission is recorded in said table for employment of charge data for a service afforded subscriber.

20. The program data distribution system for use with an open network according to claim 16, wherein said open network is the Internet.

21. The program data distribution system for use with an open network according to claim 16, wherein said encryption key is a public key and said decryption key is a secret key, and using the RSA encryption method, said program data is encrypted by employing said public key.

22. The program data distribution system for use with an open network according to claim 16, wherein said encryption key is a secret key and said decryption key is a public key, and using the RSA encryption method, said program data is encrypted by employing said secret key.

* * * * *